United States Patent Office 3,247,174
Patented Apr. 19, 1966

3,247,174
GRAFT COPOLYMERS
Johann Wolfgang Breitenbach and Helmut Edelhauser,
Vienna, Austria, assignors to Dr. Werner H. Kreidl,
c/o Stroock & Stroock & Lavan, New York, N.Y.
No Drawing. Filed Apr. 7, 1961, Ser. No. 101,335
4 Claims. (Cl. 260—885)

When copolymerizing two monomers A and B, the ratio of the A-units and the B-units in the polymer molecules obtained by such copolymerization is determined by the quantitative ratio of A and B in the original mixture of the monomers and by the ratio of the rate constants with which the double bonds of A and B react with the radicals of A and B, respectively. The copolymerization parameters, which are also designated as $r$-values, constitute a measure for said rate constants. In the case of a pair of monomers A and B the $r$-value of A ($r_A$) is understood to be the ratio of the rate constant with which the double bond of A reacts with the A-radical to the rate constant with which the double bond of B reacts with the A-radical. Conversely, $r_B$ is the ratio of the rate constant, with which the double bond of B reacts with the B-radical, to the rate constant with which the double bond of A reacts with the B-radical. Thus, the $r$-values are not absolute values for individual substances, but, whenever referred to below, said $r$-values are always related to a pair of substances. In connection with said $r$-values reference is made to "Principles of Polymer Chemistry" by P. J. Flory, Cornell University, Ithaca, N.Y., 1953, page 179. The more the copolymerization parameters or $r$-values of two monomers A and B differ from each other, i.e., the more rapidly the double bonds of A react with the A- and B-radicals, compared with the double bonds of B, the more different is the composition of the copolymer from the composition of the original monomer mixture.

In case of an extremely great difference of the $r$-values in the polymerization of a mixture of two monomers A and B, in which mixture the two monomers are present in comparable or equal quantities, the monomer with the higher $r$-value, e.g. the monomer A, will first polymerize only with itself, substantially pure poly-A being formed thereby. This will continue until the monomer A content of the monomer mixture has become very small, whereafter a small quantity of the copolymer of A and B of rapidly changing composition is formed, the polymerization rate being considerably decreased at the same time, the monomer A acting as inhibitor in the polymerization of B. Upon substantially complete consumption of A and after having overcome the inhibition period, the further polymerization reaction will supply substantially pure poly-B at a normal rate. On account of these facts it is not possible to obtain reasonable yields of copolymers when copolymerizing monomers have greatly different $r$-values.

The present invention now relates to a process for producing graft copolymers from monomers having greatly different copolymerization parameters ($r$-values), by which process the above mentioned disadvantages are avoided, said process permitting copolymerization of monomers having greatly different $r$-values, a substantially uniform final product being formed with favourable yields. The process according to the present invention essentially consists in the fact that the monomer or monomers (A) having the higher $r$-value are reacted with at least one asymmetric bifunctional monomer (CD) the groups of which containing the two double bonds, have greatly different $r$-values; the one group (C) has about the same higher $r$-value as forming with the monomer or monomers (A), respectively, whereas the other group (D) has about the same $r$-values as the monomer or monomers (B), respectively.

The monomer A with the higher $r$-value thus copolymerizes in the first step of the process with the asymmetric bifunctional compound CD in the usual manner, whereby substantially the double bonds of A and C are consumed, whereas the number of the double bonds of D, due to the relative inertness of these double bonds, remains substantially unchanged, said double bonds forming unsaturations on the primary polymer chain. The relative inertness of the double bond of D relative to the radicals A and C permits proceeding the polymerization reaction to a relatively high degree of conversion without any cross-linking occurring simultaneously, in contradistinction to the copolymerization of a monomer A with a symmetric bifunctional compound CC, e.g. a symmetric divinyl compound, where, as is well known, the formation of cross-linked, insoluble polymers cannot be prevented, already at very low degree of conversion.

Copolymerization of a monofunctional monomer with an asymmetric bifunctional compound, e.g. the reaction of methyl methacrylate with allyl methacrylate, is known per se. Such copolymerization, however, is concerned with a different problem, since the object of such known copolymerization is not the copolymerization of monomers with greatly different $r$-values. In said known copolymerization a product is obtained, which still contains reactive groups which originate from the asymmetric bifunctional compound, such reactive groups producing extensive cross-linking on further reaction.

When carrying out the process of the present invention, the two monomers A and CD being copolymerized in the manner specified above, a primary polymer will be formed having the composition shown below:

Such products of the primary polymerization reaction are then reacted, in a manner known per se, with the monomer B having the lower $r$-value, said reaction being initiated by a starting agent; the monomer B thereby copolymerizes with the group D of the asymmetric bifunctional monomer CD in accordance with the quantitative ratio of these two substances and in accordance with the respective $r$-values which are not much different from each other, a graft copolymer being thus obtained, the "back-bone chains" of which contain A and C, and the side chains of which are formed by grafting B onto the D groups at all those points where CD-units are present between the A-units of the "back-bone chain."

The number of side chains B per back-bone chain is determined by the ratio of CD to A and can be varied at will. With higher CD contents of the primary polymer, however, there exists the possibility of cross-linkage and consequently the possibility of formation of insoluble polymers already in the first polymerization step, and more particularly in the second polymerization step, in the case where polymerization is carried on to high degrees of conversion. Such cross-linkage can be avoided by reducing the reaction temperature, by adding transfer agents, such as carbon tetrabromide, and finally by terminating the polymerization at relatively low degrees of conversion in any manner known per se. With equal content of bifunctional compound such cross-linking will, in any case where an asymmetric monomer having a relatively inert and a reactive double bond is employed, take place at much higher conversion degrees than would be the case if a monomer was used which has two equally reactive double bonds.

A further possibility of diminishing the risk of cross-linkage consists in using a limited quantity of the asymmetric bifunctional monomer CD, e.g. a quantity of less than about 10 mole percent, preferably considerably less than 10 mole percent, with relation to the monomer A having the higher $r$-value.

Such monofunctional compounds are used for the purpose of the present invention as monomers A with higher $r$-values, which contain a conjugate aliphatic carbon-carbon double bond. As monomers B having lower $r$-values, such monofunctional substances are used which have a non-conjugate aliphatic carbon-carbon double bond, and as asymmetric bifunctional monomers CD there are used substances which contain a conjugate as well as a non-conjugate aliphatic carbon-carbon double bond.

The process according to the present invention is applicable to the copolymerization of monomers the $r$-values of which differ from each other by a multiple. As an example, this is the case where the ratio of the higher $r$-values to the lower $r$-values is at least 50, preferably at least 500, for example about 2500. An example for such 2500-fold difference of the two $r$-values is a polymerization mixture of styrene and vinyl acetate, styrene having an $r$-value which is about 2500 times as great as the $r$-value of vinyl acetate.

Further examples for ratios of $r$-values of pairs of monomers AB are compiled below (P. J. Flory, Principles of Polymer Chemistry, page 188).

Styrene:vinylacetate _____ Abt. 2500
Styrene:vinylchloride _____ Abt. 600
Methylmethacrylate:vinylacetate _____ Abt. 1400
Methylmethacrylate:vinylchloride _____ Abt. 100
Acrylonitrile:vinylacetate _____ Abt. 90
Acrylonitrile:vinylchloride _____ Abt. 50
Methylmethacrylate:allylacetate _____ Abt. 1250

The ratio of the $r$-values of the monomers A having the higher $r$-values with relation to B, to those of group C, which form with said monomers A a pair of reactants having about equal $r$-values, and of the monomers B having the lower $r$-values (relative to A) to those of the group D which forms with said monomers B a pair of reactants having about equal $r$-values, is for said pairs of reactants AC and BD, respectively, preferably not more than 10, particularly not more than 2.

Examples of such ratios are:

Styrene:methylmethacrylate (for the methacrylate group) _____ 1.16
Vinyl acetate:allyl acetate (for the allyl group) ___ 1.3
Acrylonitrile:methyl methacrylate (for the methacrylate group) _____ 7.4

As monomers A with the higher $r$-values, i.e. as monofunctional substances containing a conjugate aliphatic carbon-carbon double bond, there can be used e.g. styrene, saturated esters of acrylic acid or methacrylic acid, particularly methyl methacrylate; acrylo nitrile, methacrylo nitrile and vinyl pyridine.

As monomers B with the lower $r$-values, i.e. as monofunctional compounds containing a non-conjugate aliphatic carbon-carbon double bond, there may be used e.g. vinyl esters of fatty acids, such as vinyl propionate, vinyl butyrate, vinyl stearate and particularly vinyl acetate; as well as vinyl chloride, allyl esters of fatty acids, particularly allyl acetate; and N-vinyl pyrrolidone, or the like.

As asymmetric bifunctional monomers CD there are used, as has already been mentioned above, organic compounds which contain a conjugate aliphatic carbon-carbon double bond and one or more non-conjugate aliphatic carbon-carbon double bonds. The case of a conjugate double bond is understood to exist in any such case where a carbon-carbon double bond is in conjugate position to an unsaturated group, such as $C=O$, $C\equiv N$, phenyl ring, pyridine ring or the like. Examples for such asymmetric bifunctional monomers CD are: allyl acrylate, allyl methacrylate, methallyl acrylate, allyl styrene, or the like, as well as originally symmetric divinyl compounds, in which, on account of the polymerization, the reactivity of the second double bond is materially diminished.

The process according to the present invention is applicable to the copolymerization of styrene and vinyl acetate with particular advantage. In this case e.g. allyl methacrylate can be used as bifunctional asymmetric compound.

Polymerization may be effected either in bulk or in emulsion. In the latter case it is possible to use either water-soluble initiators, such as potassium persulfate and hydrogen peroxide, or oil-soluble initiators, such as $\alpha,\alpha'$-azo-bis-isobutyronitrile and emulsifiers such as soaps, neutral ionic detergents, like sodium-dodecylbenzenesulfonate and non-ionic detergents like polyvinylalcohol. Emulsion polymerization is of great interest particularly in those cases where the formation of insoluble, non-dispersible polymers by cross-linking reactions is to be avoided. By confining the polymerization to latex particles, the size of the cross-linked macro-molecule can be prevented from exceeding the volume of such latex particles. The diameters of said latex particles are in the range of about 1000 A. At the end of the emulsion polymerization, the polymer, even in the case where it is cross-linked, is thus present as latex in a finely dispersed state in which form it may be used directly for certain purposes, e.g. for coatings, as adhesive, etc. These small cross-linked particles can, however, also be solubilized homogeneously in the form of a microsol by means of a suitable solvent, even after isolation of the polymer from the latex. It is thus possible to carry on polymerization in both steps to a conversion degree of essentially 100%, yet obtaining a soluble product.

Production of the graft copolymers according to the present invention can also be effected in a single procedure, the monomer A having the higher $r$-value being first copolymerized in emulsion with the asymmetric bifunctional monomer CD to such an extent that essentially complete conversion is obtained. It is herewith possible to use a relatively large quantity of the bifunctional monomer CD as, on account of the reasons stated above, partial cross-linking of the primary polymer does not have any disturbing effect. There will, in any case, remain a quantity of unsaturated groups even in the partially cross-linked primary polymer, which is sufficient for grafting. The last residual quantities of the monomer A, which are difficult to polymerize completely, which, however, may act as inhibitor in the polymerization of monomer B, can be removed from the latex by venting or stripping. The required quantity of the monomer B with the lower $r$-value is then added to the latex and polymerization is continued, an inhibition period being possibly observed, the duration of which depends upon the degree of completeness of removal of monomer A from the primary polymer latex. The monomer B, too, can be polymerized essentially completely, the graft copolymer being obtained in fine dispersion in latex form. In the case where a relatively large quantity of CD is used, the graft copolymer in the latex particles will be cross-linked, will, however, still contain unconsumed double bonds, so that cross-linking can be continued after its application, e.g. in the form of a film, by heating or ageing, the final product thus obtained being completely insoluble and resistant against solvents. The properties of an originally thermoplastic polymer can be thus combined with the properties of a thermo-setting polymer.

The following examples serve to more thoroughly illustrate the process according to the present invention. Although the following examples relate to that case only, where just one substance is used as the monomer A with the higher $r$-value, only one substance as the monomer B with the lower $r$-value, and one substance as the asymmetric bifunctional compound CD, the present invention is by no means limited to this case, it being very well possible to use as A, as B and as CD as well, mixtures of several substances.

Example 1

4.5 parts by weight of styrene and 0.05 part of allyl methacrylate are polymerized in bulk at a temperature of 60° C. in the presence of an oil-soluble initiator, e.g. of $4.5 \cdot 10^{-3}$ moles of $\alpha,\alpha'$-azo-bis-isobutyronitrile per mole of styrene, the reaction being carried on for a period of 13 hours, a conversion of 60% being thus obtained. The soluble primary polymer thus produced, which polymer has an average degree of polymerization of $\overline{P} \sim 800$, is isolated and dissolved in vinylacetate used at a quantitative ratio of 1:20, the solution being then polymerized in bulk for 4 hours at a temperature of 50° C. and in the presence of $1 \cdot 10^{-3}$ moles $\alpha,\alpha'$-azo-bis-isobutyronitrile, until 25% of the vinyl acetate quantity have been consumed in polymerization. The final product is soluble in benzene, and, when fractionated, is found to be a styrene-vinyl acetate graft copolymer.

Example 2

Using an original mixture identical to that of Example 1, there is added thereto in the first polymerization step a quantity of $2.25 \cdot 10^{-3}$ moles carbon tetrabromide per mole of styrene, said carbon tetrabromide acting as transfer agent. Polymerization is carried on at 60° C. for 20 hours until 90% conversion is obtained. The primary polymer thus produced shows an average degree of polymerization of $\overline{P} \sim 200$. The further procedure is that of Example 1.

Example 3

4.5 parts of styrene and 0.003 part of allyl methacrylate are polymerized in bulk at 60° C. for 10 hours, in the presence of an oil-soluble initiator, such as $4.5 \cdot 10^{-3}$ moles of $\alpha,\alpha'$-azo-bis-isobutyronitrile per mole of styrene, 50% of the monomers being thus converted to a soluble primary polymer of $\overline{P} \sim 500$. The latter is isolated, whereupon 1 part of it is dissolved in 3.5 parts of vinyl acetate, the mixture being then polymerized in bulk for 20 hours at 50° C., in the presence of $1 \cdot 10^{-3}$ moles of $\alpha,\alpha'$-azo-bis-isobutyronitrile per mole of vinyl acetate. 70% of the vinyl acetate quantity are reacted thereby. ⅔ of the polyvinyl acetate thus produced are insoluble in methanol and therefore linked to polystyrene by main valences in the form of a graft copolymer. The final product is completely soluble in benzene. The viscosity index of said product, determined by measuring the duration of passage through a capillary-type viscosimeter, was found to be 250 ml./gram.

Example 4

5 parts of styrene and 0.6 part of allylmethacrylate are emulsified in 100 parts of an aqueous solution of an emulsifier, e.g. a 0.01 molar solution of sodium-dodecyl-benzene-sulfonate, whereupon polymerization is effected at 70° C. for 1 hour, in the presence of a water—or oil—soluble initiator, e.g. 0.0065 mole of potassium persulfate per 1 litre of water, said polymerization being carried on to a conversion of substantially 100%. 8.3 parts of vinyl acetate are then added to the latex thus obtained, the polymerization temperature being maintained at 70° C. After 7 hours, the vinyl acetate is substantially completely polymerized. About 70% of the polyvinyl acetate formed are found to be insoluble in methanol and therefore, linked to the primary polymer by main valences in the form of a graft copolymer. Upon air-drying, the latex thus obtained will form a film insoluble in benzene on account of further cross-linking reactions of residual, free allyl double bonds. When carrying out a blank test without allyl methacrylate under otherwise identical conditions, all of the polymer formed in the second step is found in the fraction which is soluble in methanol which, on analysis, is found to be substantially pure polyvinyl acetate.

Example 5

5 parts of styrene and 0.6 part of allyl methacrylate are emulsified in 100 parts of an aqueous solution of an emulsifier, e.g. a 0.05 molar solution of sodium-dodecyl-benzene-sulfonate, whereupon polymerization is effected at 70° C. for ½ hour, in the presence of a water—or oil—soluble initiator, e.g. 0.3 part of hydrogen peroxide, said polymerization being carried on to a conversion of substantially 100%. 62 parts of vinyl acetate are then added to the latex thus obtained, the polymerization temperature being maintained at 70° C. After 3 hours, the vinyl acetate is substantially completely polymerized. Upon air-drying, the latex thus obtained will form a resilient film which on ageing, will become insoluble in benzene on account of further crosslinking reactions of residual, free allyl double bonds, which film will be found to also have improved resistance against water when compared with the water-resistance characteristics of pure polyvinyl-acetate.

Example 6

15 parts of styrene and 0.18 part of allylmethacrylate are emulsified in 70 parts of an aqueous solution of an emulsifying agent, e.g. a 0.07 molar solution of sodium-dodecylbenzene-sulfonate, whereupon polymerization is effected at 70° C. for ½ hour, in the presence of a water- or oil-soluble initiator, e.g. 0.014 mole of potassium persulfate per 1 litre of water, said polymerization being carried on to a conversion of substantially 100%. 57 parts of vinyl acetate are then added to the latex thus obtained, the polymerization temperature being maintained at 70° C. After 20 hours, the vinyl acetate is substantially completely polymerized. A film consisting of the graft copolymer thus obtained, and formed upon air-drying of the latex shows resilience characteristics lying between those of the graft copolymer obtained in accordance with the procedure of Example 4 and those of the graft copolymer obtained in accordance with the procedure of Example 5.

Example 7

5 parts of styrene and 0.6 part of allyl methacrylate are emulsified in 100 parts of an aqueous solution of an emulsifying agent, e.g. a 0.01 molar solution of cetyl-trimethyl-ammoniumchloride, whereupon polymerization is effected at 50° C. for 5 hours, in the presence of a water- or oil-soluble initiator, e.g. 0.025 mole of $\alpha,\alpha'$-azo-bis-isobutyronitrile per 1 litre of water, said polymerization being carried on to a conversion of substantially 100%. 8.3 parts of vinyl acetate are then added, the polymerization temperature being maintained at 50° C. After 38 hours, the vinyl acetate is substantially completely polymerized. 83% of the polymer obtained are insoluble in methanol, and can, therefore, be considered to be a graft copolymer. In spite of the cross-linking reactions which have already occurred with the primary polymer, the present graft copolymer will form, after its isolation from the latex a homogeneous solution of blueish opalescence, a so-called microsol, when dissolved in benzene.

Example 8

5 parts of methyl methacrylate and 0.6 part of allyl methacrylate are emulsified in 100 parts of an aqueous solution of an emulsifying agent, e.g. a 0.01 molar solution of sodium-dodecylbenzene-sulfonate, whereupon polymerization is effected at 70° C. for ½ hour, in the presence of a water- or oil-soluble initiator, e.g. 0.0065 mole of potassium persulfate per 1 litre of water, said polymerization being carried on to a conversion of substantially 100%. 8.5 parts of vinyl acetate are then added to the latex thus obtained, the polymerization temperature being maintained at 70° C. After half an hour, the vinyl acetate is substantially completely polymerized. The polymer film obtained by air-drying said latex is insolbut under otherwise identical conditions, is soluble in In contradistinction thereto, polyvinyl acetate formed in the course of a blank test without allyl methacrylate, but under otherwise identical conditions, is soluble in methanol and benzene to an extent of substantially 100%.

*Example 9*

3.6 parts of acrylonitrile and 0.9 part of allyl methacrylate are emulified in 100 parts of an aqueous solution of an emulsifying agent, e.g. a 0.01 molar solution of sodium-dodecylbenzene-sulfonate, whereupon polymerization is effected at 70° C. for 20 minutes, in the presence of a water- or oil-soluble initiator, e.g. 0.0065 mole of potassium persulfate per 1 litre of water, said polymerization being carried on to a conversion of about 50%. 11.8 parts of vinyl acetate are then added to the latex thus obtained, the polymerization temperature being maintained at 70° C. After 4 hours, the vinyl acetate is substantially completely polymerized. A film obtained by air-drying the latex thus obtained consists to about 14% of polyacrylonitrile and to about 86% of a vinyl acetate/acrylonitrile copolymer, with an acrylonitrile content of about 16%. About 70% of such film are insoluble in methanol and dimethyl formamide. A polymer obtained in the course of a blank test without allyl methacrylate, but under otherwise identical conditions, is soluble in methanol to an extent of 86%, and completely soluble in dimethyl formamide.

*Example 10*

15 parts of styrene and 1.8 parts of allyl methacrylate are emulsified in an aqueous solution of an emulsifying agent, e.g. a 0.05 molar solution of sodium-dodecylbenzene-sulfonate, whereupon polymerization is effected at 70° C. for 1½ hours, in the presence of a water- or oil-soluble initator, e.g. 0.026 mole potassium persulfate per 1 litre of water, said polymerization being carried on to a conversion of substantially 100%. 20 parts of vinyl chloride are then added to the latex and the potassium persulfate concentration is increased by 50%. Polymerization is then effected for 20 hours at 50° C., whereupon the vinyl chloride is polymerized to substantially 100%. The graft copolymer obtained by drying the latex is partially insoluble in tetrahydrofurane and partially soluble therein in the form of a microsol, whereas the polymer obtained in the course of a blank test carried out without allyl methacrylate, under otherwise identical conditions, is completely soluble in tetrahydrofurane.

Apart from the substances used as initiators in the examples, other known initiators may be used.

Instead of allyl methacrylate used as asymmetric bifunctional monomer in the above examples, other asymmetric bifunctional monomers, such as allyl acrylate, methallyl acrylate and allyl styrene have been used successfully.

The graft copolymers produced in accordance with the present invention show improved impact strength, when compared with polystyrene, and improved resistance against water, when compared with polyvinylacetate.

The latex obtained as final product of Examples 4–9 may be used directly as coating composition, the film being formed on drying being subjected to further cross-linking on account of residual un-consumed allyl double bonds, and thus becoming non-reemulsifiable and resistent against water and organic solvents.

What we claim is:

1. A process of copolymerizing in aqueous emulsion by graft polymerization a monomer (A) having a conjugated double bond and possessing a very high copolymerization parameter ($r$-value) with a monomer (B) having a non-conjugated double bond and possessing a very low $r$-value, the $r$-values of said two monomers (A) and (B) differing from each other by a ratio of at least 50 to 1, comprising the steps of first copolymerizing in aqueous emulsion a monomer (A) selected from the group consisting of styrene and methylmethacrylate with at least one asmmetric monomer (CD) having one conjugated (C) and one non-conjugated (D) double bond, said monomer (CD) being selected from the group consisting of allyl acrylate, allyl methacrylate, methallyl acrylate and allyl styrene and second, further copolymerizing in aqueous emulsion the reaction products obtained in said first step with a monomer (B) selected from the group consisting of vinyl acetate and allyl acetate, the two double bonds (C) and (D) of said monomer (CD) having $r$-values differing from each other by a ratio of at least 50 to 1, the group (C) having about the same very high $r$-value as the monomer (A) and the group (D) having about the same very low $r$-value as the monomer (B), said monomer (CD) being used in quantities of up to 10 mole percent, calculated on the basis of the quantity of said monomer (A), said aqueous emulsion polymerization of both the first and the second step being carried out in the presence of reaction initiators which remain stable in aqueous solution, said initiators being selected from the group consisting of water soluble and oil soluble initiators, whereby in said first step of copolymerization the group (C) of the monomer (CD) copolymerizes with the monomer (A), while in said second step the group (D) of said reaction product formed in the first step, copolymerizes now with the monomer (B), to obtain a high yield of a substantially uniform, hard copolymer of high resistance to shock and impact.

2. A process, as claimed in claim 1, in which the reaction initiator consists of potassium persulfate.

3. A process, as claimed in claim 1, in which the reaction initiator consists of hydrogen peroxide.

4. A process, as claimed in claim 1, wherein the reaction initiator consists of $\alpha,\alpha'$-azo-bis-isobutyronitrile.

References Cited by the Examiner

UNITED STATES PATENTS

| | | | |
|---|---|---|---|
| 2,598,316 | 5/1952 | Tawney | 260—885 |
| 2,830,032 | 4/1958 | Siebel | 260—886 |
| 2,958,673 | 11/1960 | Jen | 260—881 |
| 3,055,859 | 9/1962 | Vollmert | 260—881 |

OTHER REFERENCES

Flory: Principles of Polymer Chemistry, pp. 31 and 188, Cornell U. Press, Ithaca, N.Y., 1953.

SAMUEL H. BLECH, *Primary Examiner.*

WILLIAM H. SHORT, JAMES A. SEIDLECK, MURRAY TILLMAN, *Examiners.*